United States Patent
Yang

(10) Patent No.: US 7,447,524 B2
(45) Date of Patent: Nov. 4, 2008

(54) CELL TIMING DISTRIBUTION MECHANISM

(75) Inventor: Wu-Han Yang, Kaohsiung (TW)

(73) Assignee: Qisda Corporation, Taoyuan County (TW)

( * ) Notice: Subject to any disclaimer, the term of this patent is extended or adjusted under 35 U.S.C. 154(b) by 231 days.

(21) Appl. No.: 11/073,002

(22) Filed: Mar. 4, 2005

(65) Prior Publication Data

US 2005/0197128 A1      Sep. 8, 2005

(30) Foreign Application Priority Data

Mar. 5, 2004      (TW)      ............................... 93105822 A

(51) Int. Cl.
*H04B 1/38*      (2006.01)
*G06F 1/00*      (2006.01)

(52) U.S. Cl. ................. 455/561; 455/502; 713/401; 713/502

(58) Field of Classification Search ............... 455/502, 455/503; 370/324, 350; 713/400, 401, 500, 713/502, 600
See application file for complete search history.

(56) References Cited

U.S. PATENT DOCUMENTS

| | | | | |
|---|---|---|---|---|
| 5,898,697 A | * | 4/1999 | Hurme et al. | 370/508 |
| 5,963,868 A | * | 10/1999 | Baek | 455/503 |
| 6,377,792 B1 | * | 4/2002 | Brown et al. | 455/411 |
| 6,771,985 B1 | * | 8/2004 | Iinuma | 455/561 |
| 6,847,826 B1 | * | 1/2005 | Wesby et al. | 455/502 |
| 6,937,617 B2 | * | 8/2005 | Rakib et al. | 370/485 |

* cited by examiner

*Primary Examiner*—George Eng
*Assistant Examiner*—Matthew C Sams

(57) ABSTRACT

A method and system of cell timing distribution which greatly reduces the bus bandwidth required for transmission of cell timing information in a WCDMA base station. The system of the present invention comprises a timing control unit connected to several communication cells through transmission lines. Each communication cell comprises a timing generator which determines a local timing (sfn) according to a frame boundary signal and a timing difference (t_cell) parameter received from the timing control unit. The frame boundary signal indicates the starting boundary of the central base station (nodeB) timing, whereas the t_cell parameter represents the offset between the local cell timing and the nodeB timing. The timing generator is implemented using a finite state machine and a counter.

7 Claims, 3 Drawing Sheets

CELL TIMING DISTRIBUTION MECHANISM

BACKGROUND OF THE INVENTION

1. Field of the Invention

The present invention relates to a cell timing distribution method and system thereof, and more specifically, to a cell timing distribution mechanism for a Wideband Code Division Multiple Access (WCDMS) Base Transceiver Station (BTS).

2. Description of the Related Art

The WCDMA BTS, usually referred to a base station or NodeB, comprises a plurality of Communication Channel Blocks (CCBs) performing various data processing procedures such as air interface L1 process and some basic radio resource management operations in a wireless communication system. The air interface L1 processing comprises channel coding, interleaving, frequency conversion, rate adaptation, and spectrum spreading. The CCBs present in the same base station are differentiated in many aspects such as frequency and antenna direction. Every CCB in the same base station must operate according to the same reference clock to ensure system synchronization during data processing.

FIG. 1 shows a structure for cell timing delivery system 10 in a typical base station. As shown in FIG. 1, base station timing control unit 11 delivers each timing signals 131~13n to one of the corresponding Communication Channel Blocks (CCB) 121~12n respectively. The timing signals 131~13n received from the base station timing control unit 11 are used to derive local references, such as, cell frame boundary, cell slot number, cell slot boundary, and various counters.

The Third Generation Partnership Project (3GPP) specification regulates a timing difference parameter (t_cell), which is the timing difference between individual CCB 121~12n and the base station 10. In order to prevent all the CCBs 121~12n from simultaneously occupied the bus bandwidth and the attendant noise interference, the timing differences assigned to the CCBs 121~12n are not identical. The timing of the base station 10 is represented by a nodeB frame number (bfn) specified by 3GPP, and similarly, the timing of each CCB 121~12n is referred to system frame number (sfn). The timing difference parameter t_cell of each CCB indicates the offset of frame timing between the bfn and the sfn of the CCB. The timing difference parameter t_cell assigned to each CCB also denotes the operating delay of the CCB compared to the bfn used in the base station. Therefore, the timing difference parameter t_cell determines the operational sequence of the CCBs in the base station, whereas this operational sequence is regulated by upper layer protocols. A unit length of the t_cell parameters is 265 chips. The range of the timing difference specified in the 3GPP is 256*(0~9) chips, thus there are ten possible values for the t_cell parameter: 0, 256, 512 . . . , 2304 chips. The CCB with a t_cell parameter of 0 is synchronized with the base station 10, meanomg that the bfn of the base station is always identical to the sfn of the CCB. The CCB with a t_cell parameter of 256 represents that the sfn of the CCB has a 256-chip delay offset compared to the bfn.

The timing difference parameters for each CCB are different according to 3GPP specification, the base station 10 must generate individual timing signals 131~13n for each corresponding CCB 121_12n. Each timing signal carries various relevant information, so that the timing signals 131~13n occupy a large portion of the bus bandwidth capacity. Conventionally, the timing signals 131~13n are transmitted by time division access method.

SUMMARY OF THE INVENTION

Accordingly, the object of the present invention is to reduce the bus bandwidth required for internal transmission of timing related signals in a base station.

Another object of the present invention is to design a simple cell timing distribution mechanism and method to deliver different timing signals to each communication channel block (CCB).

In order to achieve these objects, the present invention provides a cell timing distribution system for a WCDMA Base Transceiver Station (BTS), which self-recovers the system timing for the CCB according to selective information transmitted from the base station timing control unit.

The present invention provides a cell timing distribution system comprising a timing control unit, signal transmission lines, and a plurality of CCBs for various operations. Each CCB obtains a frame boundary signal and a dedicated timing difference (t_cell) parameter from the timing control unit through the signal transmission lines, and using a timing generator in the CCB to generate a unique timing signal according to an activation signal (rake_on), frame boundary signal, and timing difference parameter.

The timing generator of each CCB comprises a Finite State Machine (FSM) and a counter. The FSM changes the present state according to the activation signal (rake_on), frame boundary signal, and t_cell parameter, then outputs an enable signal (sfn_cnt_en) to the counter according to the present state. The counter generates a timing signal required for the operations in the CCB according to the enable signal. The counter only counts when the enable signal is enabled. The FSM first determines the state of the activation signal, wherein a low state means that the CCB is not yet activated, thus no counting is required. If the activation signal is activated, the FSM delays the timing used in the base station according to the received timing difference parameter to generate a timing signal. When a pulse in the frame boundary signal arrives, the FSM of the present invention waits for a time period denoted by the timing difference parameter, and then enables the enable signal allowing counting to begin. The counter can be reset by the frame boundary signal transmitted from the timing control unit, but if the enable signal is enabled, the counter cannot be reset by the frame boundary signal.

The present invention can be implemented in a base station of a wireless communication system, for example the WCDMA BTS (NodeB), wherein each CCB performs one of several procedures for data processing, such as channel coding, interleaving, spectrum spreading, and basic radio resource management operations.

The cell timing distribution method proposed in the present invention comprises transmitting a one-bit frame boundary signal and a four-bit timing difference parameter to each of the CCBs in the system. The timing generator of each CCB changes the present state of the FSM according to an activation signal and the received frame boundary signal and timing difference parameter, consequently the timing generator outputs an enable signal to a counter. The counter counts and outputs a system timing signal required for the operations in the CCB accordingly.

BRIEF DESCRIPTION OF THE DRAWINGS

The present invention can be more fully understood by reading the subsequent detailed description in conjunction with the examples and references made to the accompanying drawings, wherein.

DETAILED DESCRIPTION OF THE INVENTION

The present invention discloses an efficient cell timing distribution and recovery method and system for a WCDMA base station, which reduces the transmission load of the transmission lines since only the frame boundary signal of the base station and the timing difference parameter are transmitted to each CCB.

Figure 1:
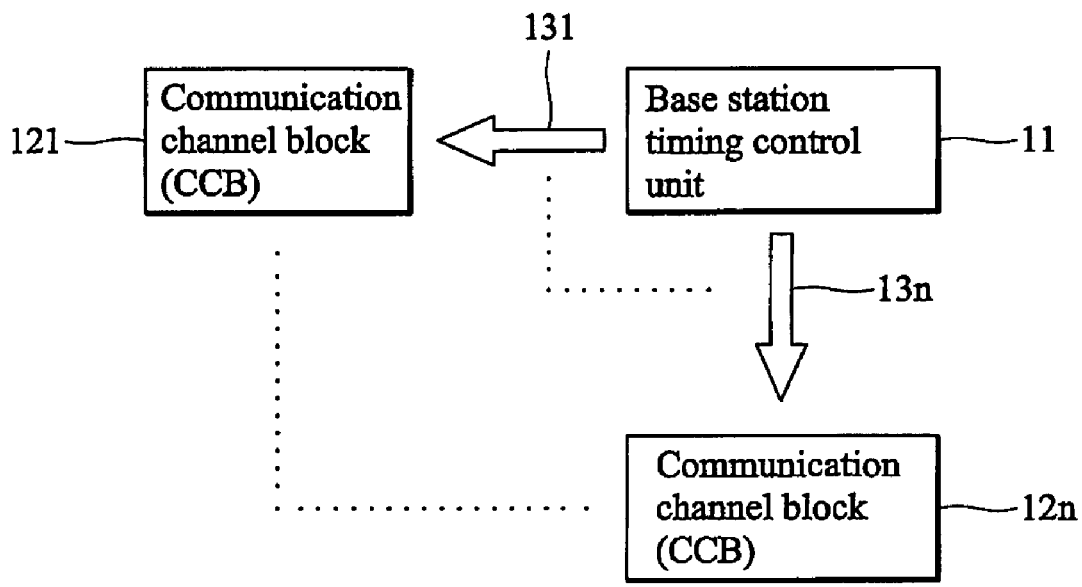
FIG. 1 illustrates the configuration of a conventional cell timing delivery system in a base station.
Figure 2:
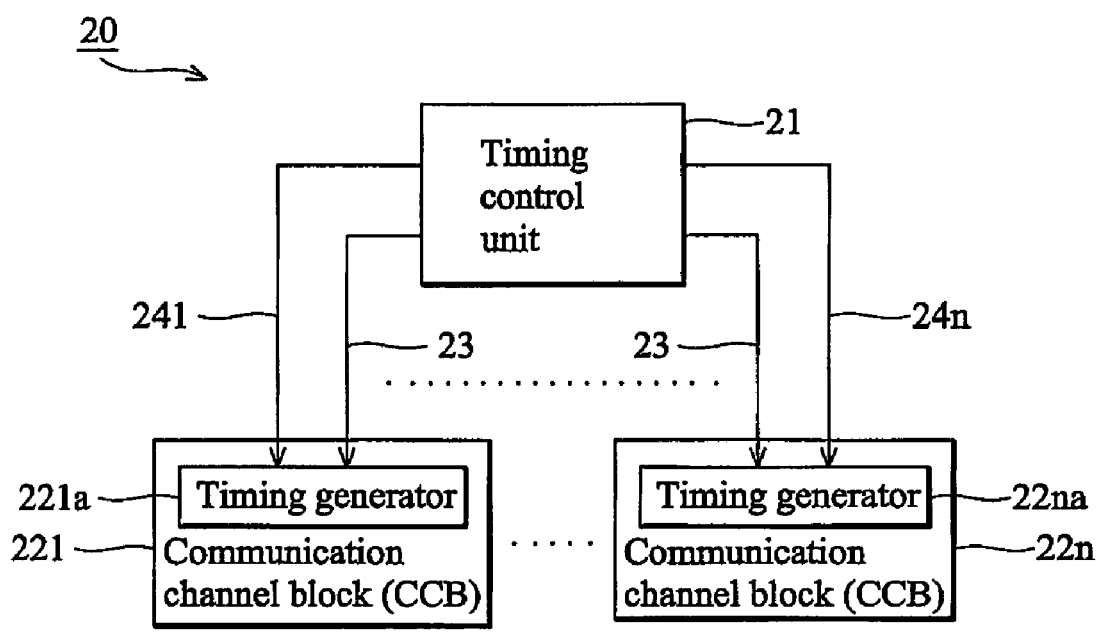
FIG. 2 illustrates the configuration of the cell timing distribution system according to the present invention.

FIG. 2 shows the configuration of the base station timing distribution system 20 employing the cell timing distribution method according to the present invention. As shown in FIG. 2, the timing control unit 21 generates and transmits two types of timing related signals to each CCB 221~22n. The two types of signals are a frame boundary signal 23 and a timing difference parameter (t_cell) 241~24n dedicated to each CCB. The frame boundary signal 23 only requires one bit of transmission bandwidth for transmitting a pulse representing the starting point of the NodeB frame number (bfn). Each of the timing difference parameters 241~24n is an integer 0~9 represented by four bits assigned by upper layer protocols, which indicate a multiple of the 256 chips. Compared to the timing signals 131~13n shown in FIG. 1, the present invention transmits only 5 bits to each CCB, which greatly reduces the transmission bandwidth required for the timing signals. The cell timing distribution system of the present invention can utilize a bus or a serial port to transmit the four-bit signals.

The timing generators 221a~22na of each CCB 221~22n automatically generates the system timing signal according to the received frame boundary signal 23 and timing difference parameters 241~24n. The frame boundary signal 23 is different from the nodeB frame number (bfn). In the 3GPP specification, the value of bfn is between 1~4096, and the length of each bfn is 10 ms. Therefore, a bfn repeats itself every 4096*10 ms=40.96 secs. The frame boundary signal 23 carries a pulse every 10 ms as a reference point, so when a pulse arrives, the CCB waits for an appropriate time period before counting the system frame number (sfn). The appropriate time period is determined by the time difference parameter (t_cell parameter) assigned to the CCB.

Figure 3:
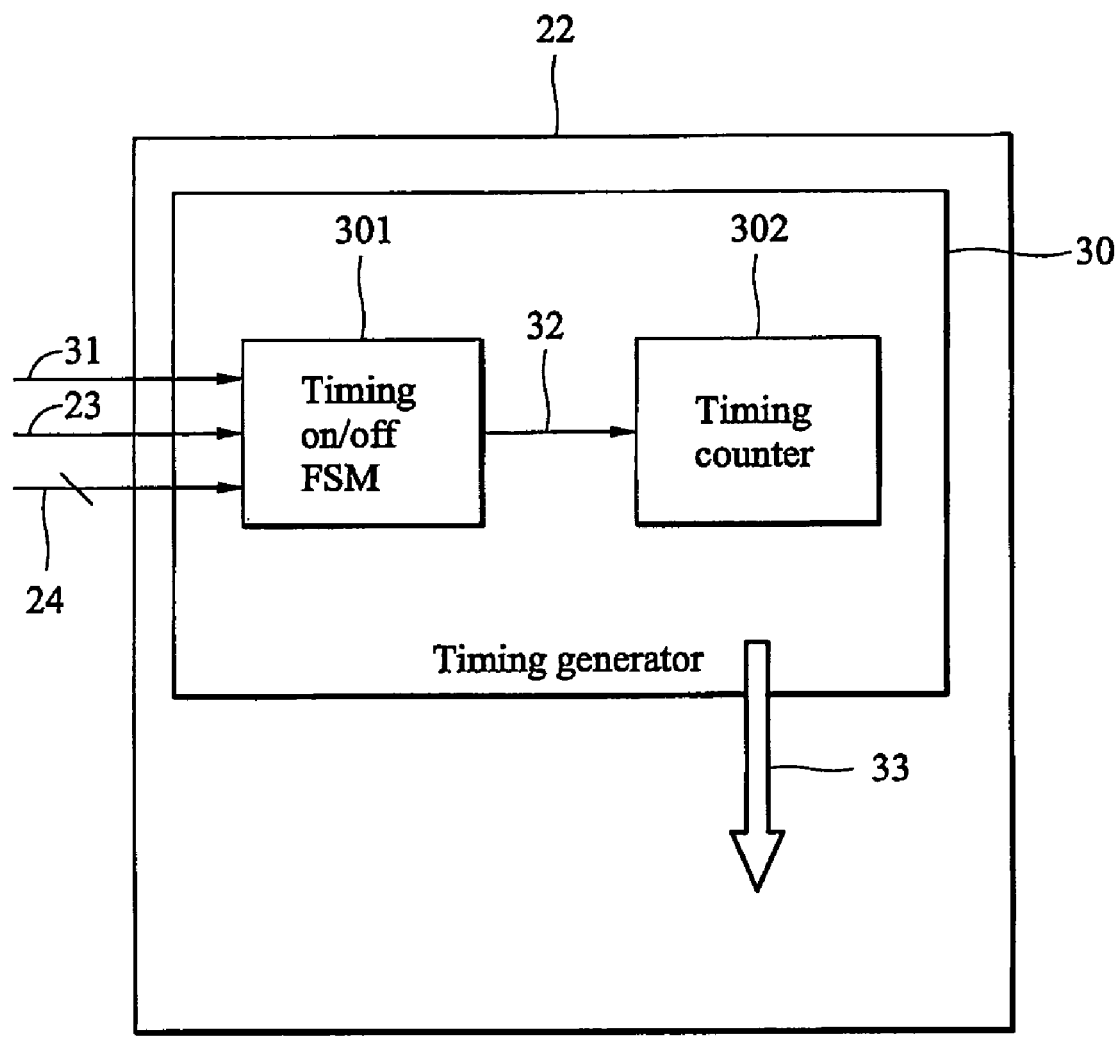
FIG. 3 is a block diagram of the Communication Channel Block (CCB) shown in FIG. 2 according to the present invention.

FIG. 3 is a block diagram illustrating a Communication Channel Block (CCB) 22 shown in FIG. 2. The timing generator 30 comprises a timing on/off finite state machine (FSM) 301 and a timing counter. The timing on/off FSM 301 receives the frame boundary signal 23, timing difference parameter 24, and an activation signal (rake_on) 31, in order to determine the output state of the system frame number counter enable (sfn_cnt_en) signal 32. The sfn_cnt_en signal 32 is used to determine whether the state of the CCB 22 is on or off. An inactive sfn_cnt_en signal 32 represents that the RAKE receiver in the CCB is not yet activated.

The RAKE receiver in the communication system denotes a transceiver capable of receiving multi-paths signal. The RAKE receiver comprises several RAKE units, wherein each RAKE unit is responsible for receiving one path. The RAKE receiver thus weights then accumulates paths received by each RAKE unit. Thus, the activation signal (rake_on) is an indication signal notifying the hardware that the RAKE unit has been activated, and is capable of receiving a dedicated path.

The timing on/off FSM 301 of the timing generator 30 first determines whether the current rake_on signal is active, and if so, when a frame boundary signal 23 arrives, the timing on/off FSM 301 generates an enable signal (sfn_cnt_en) 32 after a period of time indicated by the timing difference parameter 24. The enable signal 32 enables the timing counter 302 to start counting and outputting a timing signal 33. The timing signal 33 activates the system frame number (sfn) of the CCB 22. The timing of the sfn must be very precise as it determines the timing for transmitting and receiving.

Figure 4:
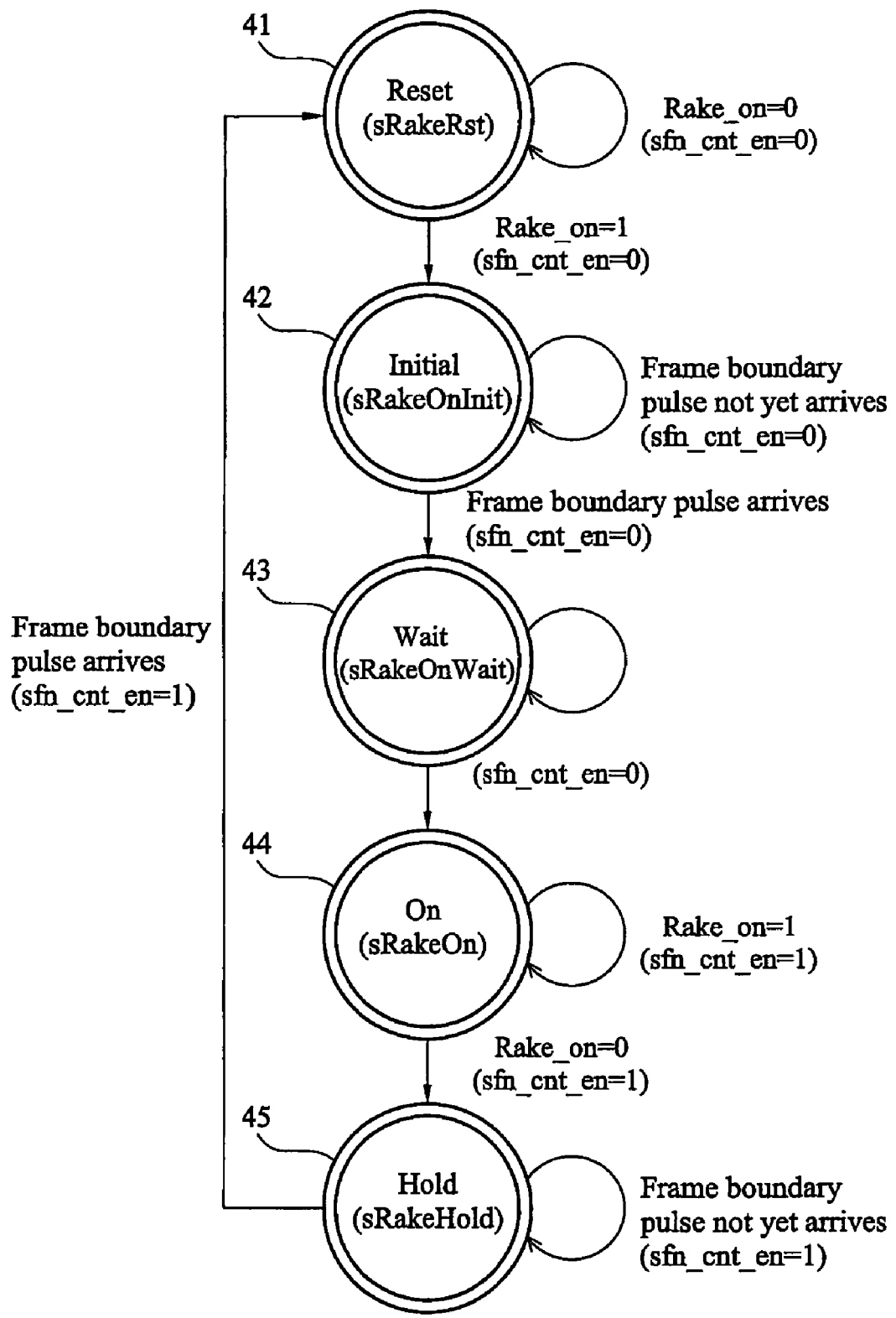
FIG. 4 is a state transition diagram of the timing on/off FSM shown in FIG. 3 according to the present invention.

FIG. 4 shows the state transition diagram of the timing on/off FSM. The FSM has five states comprising reset (sRakeRst) 41, Initial (sRakeOnInit) 42, wait (sRakeOnWait) 43, on (sRakeOn) 44, and hold (sRakeHold) 45. When the RAKE unit is inactive, the FSM stays in the reset state 41, and the output sfn_cnt_en is set to zero. The timing counter is reset by a pulse in the frame boundary signal, resulting in the timing of the CCB being identical to the timing of the base station. When the activation signal (rake_on) is at the high voltage level, the FSM enters the next state, the initial state 42, and is maintained in the initial state unless a frame boundary pulse arrives. Once a frame boundary pulse arrives, the FSM enters and stays in the wait state 43 for one clock cycle, then enters the on state 44. In the on state 44, the sfn_cnt_en signal are maintained at the high voltage level (logic "1") to disable the reset function of the frame boundary signal, thus the timing of the CCB can be obtained by delaying the timing of the base station according to a timing offset represented by the timing difference parameter. The FSM enters the hold state 45 when the activation signal rake_on is at the low voltage level (logic "0") representing the RAKE unit is currently off. The output sfn_cnt_en signal is still at the high voltage level when the FSM is kept in the hold state 45. The FSM returns to the reset state 41 after receiving the next frame boundary pulse to wait for the RAKE unit to be turned on again.

Finally, while the invention has been described by way of example and in terms of the above, it is to be understood that the invention is not limited to the disclosed embodiment. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A cell timing distribution system for a base station, comprising:
   a timing control unit, generating two types of timing signals comprising a frame boundary signal and timing difference parameters, wherein the frame boundary signal represents the timing of the base station; and
   a plurality of communication channel blocks (CCBs), each CCB receiving the frame boundary signal and a corresponding timing difference parameter from the timing control unit, and comprising a timing generator, delaying the frame boundary signal by a period corresponding to the timing difference parameter received from the timing control unit to generate a system timing signal for the CCB after receiving an activation signal;
   wherein the timing generator comprises:
   a Finite State Machine (FSM) changing a present state of the FSM according to the activation signal, the frame boundary signal, and the timing difference parameter, and outputting an enable signal according to the present state; and
   a counter, receiving the enable signal from the FSM, and counting and generating the system timing signal of the CCB according to the enable signal.

2. The cell timing distribution system according to claim 1, wherein the cell timing distribution system comprises a plurality of signal transmission lines for delivering the frame boundary signal and the timing difference parameters, and the signal transmission line is a bus or a serial port.

3. The cell timing distribution system according to claim 1, wherein the counter is reset according to the frame boundary signal only if the enable signal is not in an enabled state.

4. The cell timing distribution system according to claim 1, wherein the frame boundary signal carries one-bit information defining a starting boundary of the base station timing, and the timing difference parameter carries four-bit information representing a timing difference between the base station and the CCB.

5. A cell timing distribution method comprising:
   transmitting a frame boundary signal and a plurality of timing difference parameters from a timing control unit to a plurality of communication channel blocks (CCBs);
   each CCB receiving the frame boundary signal and a corresponding timing difference parameter;
   changing a present state of a Finite State Machine (FSM) according to an activation signal, the frame boundary signal, and the timing difference parameter, delaying a base station timing derived by the frame boundary signal by a period corresponding to the timing difference parameter and outputting an enable signal according to the present state; and
   receiving the enable signal from the FSM and generating a system timing signal required by the CCB according to the enable signal.

6. The cell timing distribution method according to claim 5, further comprising resetting the timing signal obtained by accumulating the enable signal according to the frame boundary signal only if the enable signal is not in an enable state.

7. The cell timing distribution method according to claim 5, wherein the frame boundary signal carries one-bit information defining a starting boundary of the base station timing, and the timing difference parameter carries four-bit information representing a timing difference between the base station and the CCB.

* * * * *